Sept. 30, 1947.  J. WILLIAMS  2,428,188
LEVER PLOW
Filed Aug. 7, 1945  2 Sheets-Sheet 1
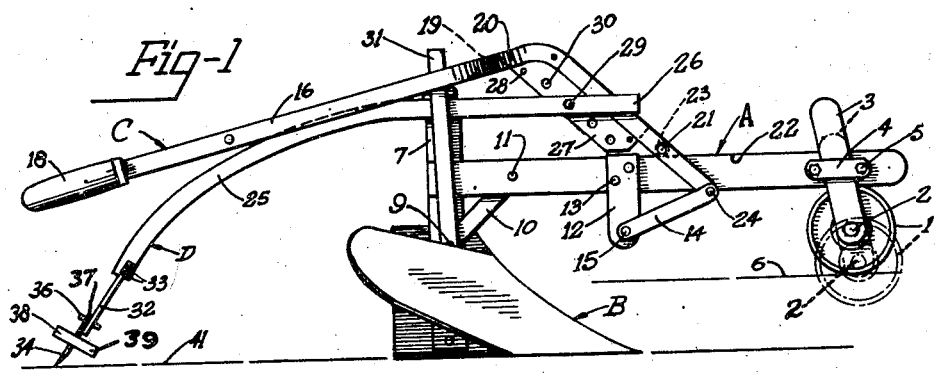
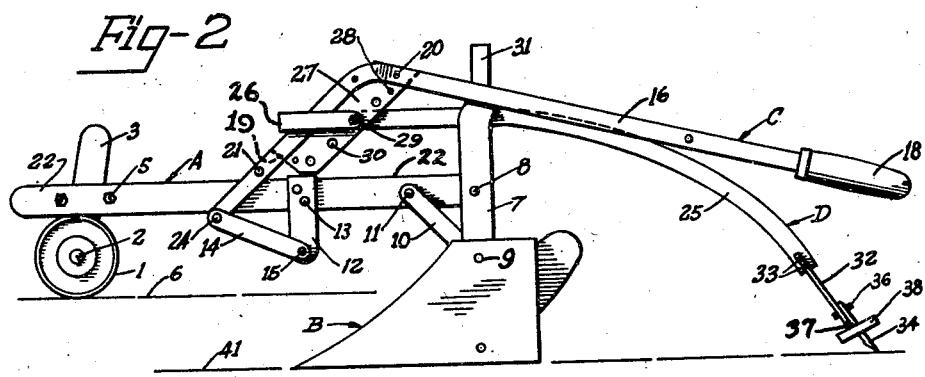
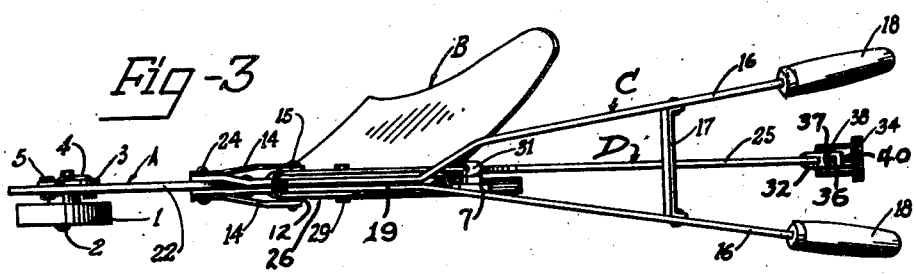
INVENTOR
JOSEPH WILLIAMS
BY Munn, Liddy & Glascum
ATTORNEYS Sept. 30, 1947.    J. WILLIAMS    2,428,188
LEVER PLOW
Filed Aug. 7, 1945    2 Sheets-Sheet 2
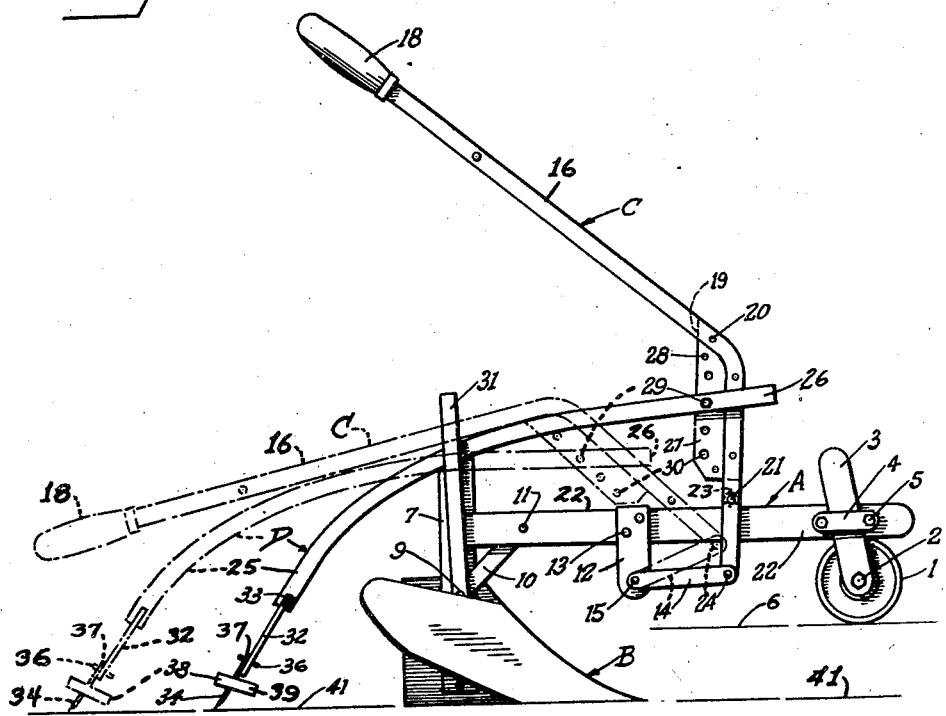
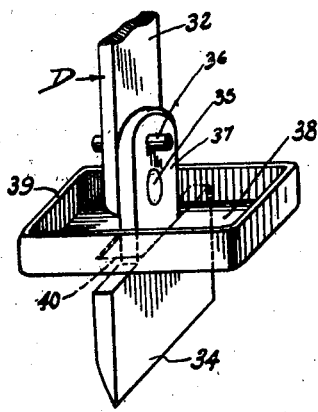
INVENTOR
JOSEPH WILLIAMS
BY
ATTORNEYS Patented Sept. 30, 1947

2,428,188

UNITED STATES PATENT OFFICE 2,428,188

LEVER PLOW

Joseph Williams, Santa Rosa, Calif.

Application August 7, 1945, Serial No. 609,429

5 Claims. (Cl. 97—59)

An object of my invention is to provide a lever plow which is designed to be operated by hand and in which the forward movement of the plow is accomplished by working the handle bars of the plow in an up and down fashion. During the upward movement of the handle bars, a moveable stop is advanced with respect to the plowshare and then a downward movement of the handle bars will cause the plowshare to be moved forwardly through the ground and away from the stop, the stop penetrating the ground a sufficient distance to give it sufficient anchorage to hold while the plowshare is forced through the ground.

A further object of my invention is to provide a lever plow in which the leverage can be adjusted so that the plowshare can be moved through varying distances with the same amount of movement of the handles. The plow can be adjusted to suit the strength of the operator who is using the plow.

A further object of my invention is to provide a device of the type described which is simple in construction and which permits a single person to operate the plow without the need of forcing the plowshare forwardly through the ground by a direct forward movement. The adjustable stop is self-cleaning and will also accommodate itself to different depths of earth through which the plowshare moves.

Other objects and advantages will appear in the following specification, and the novel features of the device will be particularly pointed out in the appended claims.

My invention is illustrated in the accompanying drawings forming a part of this application, in which:

Figure 1 is a side elevation of the plow showing the hand lever in lowered position and the adjustable support advancing the plowshare through the earth;

Figure 2 is a side elevation when looking at the lever plow from the opposite side to that shown in Figure 1;

Figure 3 is a top plan view of Figure 2;

Figure 4 is a view similar to Figure 1, but shows the hand lever in raised position for moving the adjustable stop into a new ground-engaging position preparatory to advancing the plowshare through the ground when the hand lever is again swung downwardly, and Figure 5 is an isometric view on a larger scale of the adjustable stop.

While I have shown only the preferred form of my invention, it should be understood that various changes or modifications may be made within the scope of the appended claims without departing from the spirit and scope of the invention.

In carrying out my invention, I provide a lever plow that has a longitudinally extending frame member A and this member has a ground-contacting wheel 1 adjustably secured to it at the front end of the member. Figure 4 shows the wheel rotatably mounted on a stub shaft 2 which in turn is carried by an upwardly extending support 3 which is adjustably connected to the front end of the member A by a strap 4 and bolts 5. The support 3 can be adjusted vertically in the strap 4 so as to dispose the wheel 1 the desired distance below the member A. The support 3 can also be angularly adjusted in the strap 4 within certain limits. Figure 4 shows the wheel riding on the portion 6 of the ground that has not as yet been plowed.

At the rear of the member A, I mount a plowshare indicated generally at B. This plowshare is of standard construction and is carried by an upright 7 which in turn is bolted to the rear of the frame A and secured in position by a bolt 8. The upright 7 is held against rotation about the bolt 8 by means of a bolt 9 and a truss member 10. The truss member 10 extends from the bolt 9 upwardly at an angle to the member A and has its free end connected to the member by a bolt 11.

The means for advancing the plowshare through the ground is accomplished by a manually actuated lever handle C and an adjustable stop indicated at D. I will first describe the lever handle C. Reference to Figure 4 shows a U-shaped bracket 12 secured to the member A between the bolt 11 and the strap 4. The U-shaped bracket 12 straddles the member A and is secured in place by rivets 13 or other suitable fastening means. A pair of links 14 are pivotally secured to the downwardly depending arms of the bracket 12 and are held in place by bolts 15.

The lever handle C is shown in plan view in Figure 3 and comprises two handle members 16 separated from each other by a cross strap 17 and provided with hand grips 18 at their outer ends. Figures 3 and 4 show the handle members brought into juxtaposition with a plate 19, the members 16 bearing against opposite faces of the plate and being secured to each other and to the plate by a plurality of rivets 20. At a point below the plate 19, the handle members 16 are flared away from each other so as to slidably receive the member A. A bolt 21 connects the spaced portions of the members 16 at a point directly above the top edge 22 of the member A and the bolt has a sleeve 23 rotatably mounted thereon, the sleeve riding on the edge 22 and acting as a roller for supporting the handle members 16 during their movement. The free lower ends of the members 16 are connected by bolts 24 to the links 14.

The adjustable stop D has an arcuate shaped member 25 whose forward end is formed into a U-shaped portion 26 and this portion encircles both handle members 16. Perforated plates 27 are placed on opposite sides of the plate 19 and are secured thereto by rivets 28 or other suitable fastening means. A bolt 29 is passed through one of the openings in a row of openings 30 in the perforated plate and in this way the member 25 is pivotally secured to the lever handle C. A change of the bolt 29 to the desired opening 30 will vary the movement of the plowshare through the ground for the same length of stroke of the lever handle C.

A guide strap 31 for the member 25 is formed into an elongated loop and has its ends secured together and to the plowshare by means of the bolt 9. The looped guide strap 31 extends vertically in an upward direction and cooperates with the bolt 29 and the U-shaped portion 26 in permitting the member 25 to swing about the bolt 29 as a center, but preventing any lateral movement of the member 25 with respect to the plow.

At the rear of the adjustable stop D, I mount a short strap 32 which is bifurcated at its upper end to receive the lower end of the member 25. Rivets 33 or other suitable fastening means is used for securing the short strap to the member 25. Referring to Figures 4 and 5, it will be seen that the lower end of the short strap 32 is secured to a ground engaging tooth 34 by a rivet 35 and a pin 36. Any suitable means for securing the shank 37 of the tooth 34 to the strap 32 may be provided.

I provide means for limiting the extent to which the ground engaging tooth 34 will penetrate the ground. This means comprises a perforated foot member 38 that is rectangular in shape and has a flange 39 bordering all four of its sides. The body portion of the foot has a slot 40 therein that is slightly larger than the width of the strap 32 and also slightly wider than the combined thicknesses of the strap 32 and the shank 37. The pin 36 projects beyond the strap 32 and the shank, so as to limit the upward movement of the foot. The slot 40 is large enough to permit the foot to swing into various angular positions within predetermined limits, so that the base of the foot can accommodate itself to the irregularities of the ground surface and limit the penetration of the ground engaging tooth 34 into the earth. The slot 40 may be made large enough to permit the foot to be self-cleaning and by this I mean that any dirt falling within the flange 39 may work its way through the slot and not interfere with the adjustability of the foot with respect to the strap 32 and to the ground engaging tooth 34.

From the foregoing description of the various parts of the device, the operation thereof may be readily understood.

In Figure 4 I show the plow in a position for the operator to force the plowshare through the ground at a depth below the ground surface 6 as indicated by the line 41. The lever handle C is shown in raised position in full lines and the adjustable stop D has been advanced from the position shown by the broken lines in Figure 4 into the position shown by the full lines by the mere swinging of the lever handle C upwardly from the broken line to the full line position shown in the same figure. The distance between the two positions of the ground engaging tooth 34 indicates the distance the plowshare B will be advanced through the earth along the line 41 when the lever handle C is moved from the full line position in Figure 4 into the broken line position.

The operator can place his foot on the foot member 38 to aid in holding it in position and to imbed the ground engaging tooth 34 in the ground before the lever handle C is swung downwardly. The line 41 represents the bottom of the furrow turned by the movement of the plowshare through the earth. During the initial downward movement of the lever handle C, the tooth 34 will be driven into the ground until the foot 38 rests on the surface indicated by the line 41. As already stated, this can be accomplished by the operator pressing his foot on the member 38 and driving the tooth 34 into the ground.

A downward movement of the lever handle C will cause the handle to pivot about the bolt 29 and to force the plowshare forwardly through the ground. The length of the cutting movement of the plowshare is determined by the position of the bolt 29 in one of the openings 30. After the complete forward movement has been effected, the lever handle C is again moved upwardly and will disengage the tooth 34 from the ground and move it forwardly into its next position. The operation is then repeated.

In this way the plow is intermittently advanced and far less force is required to move the plowshare through the earth because the leverage of the lever handle causes the plowshare to advance through a less distance than the movement of the lever handle. Furthermore, a downward movement of the lever handle to advance the plowshare is easier to accomplish than a direct forward movement applied to the plow by the operator.

I claim:

1. A lever plow comprising a frame, a plowshare carried thereby, a pair of links pivoted to the frame and extending forwardly, a lever handle having two arms with their front portions spaced apart and straddling the frame, said front portions of the arms being slidably guided on the frame so as to be held against lateral movement relative to the frame, the front ends of the arms being pivoted to the free ends of the links, the arms being somewhat L-shaped and having their free ends extending rearwardly and provided with hand grips, the front portion of the lever swinging through an arc in the direction of the length of the frame when the opposite end of the lever is manually raised and lowered with respect to the frame, a ground-engaging member pivoted to the front portion of the lever so as to be stepwise advanced over the ground each time the lever hand grips are raised, an upward movement of the hand grips advancing the ground-engaging member to a new position on the ground and a downward movement advancing the plowshare with respect to the ground-engaging member, and a guide strap on the frame engaging with an intermediate portion of the ground-engaging member and guiding the latter in a vertical direction but preventing lateral movement of the ground-engaging member relative to the frame.

2. A lever plow comprising a frame, a plowshare carried thereby, a pair of links pivoted to the frame and extending forwardly, a lever handle having two arms with their front portions spaced apart and straddling the frame, the front ends of the arms being pivoted to the free ends of the links, the arms being somewhat L-shaped and having their free ends extending rearwardly and provided with hand grips, the front portion of the lever swinging through an arc in the direction of the length of the frame when the opposite end of the lever is manually raised and lowered with respect to the frame, a ground-engaging member pivoted to the front portion of the lever so as to be stepwise advanced over the ground each time the lever hand grips are raised, an upward movement of the hand grips advancing the ground-engaging member to a new position on the ground and a downward movement advancing the plowshare with respect to the ground-engaging member, and a roller carried by the arms at a point where the roller will ride on the frame as the lever handle is manipulated, whereby the front portion of the lever is kept supported on the frame.

3. In a lever plow of the type described, a ground-engaging member adapted to be stepwise advanced over the ground, a tooth carried by the member and adapted to penetrate the ground, a slotted foot-piece normally resting on the tooth and supported on projecting portions thereof with the ground-engaging member extendable through the slot, and a pin carried by the ground-engaging member for limiting the upward movement of the foot with respect to the tooth, the foot in turn limiting the penetration of the tooth into the ground when the foot abuts the pin.

4. A lever plow comprising a frame, a plowshare carried thereby, a link pivoted to the frame, a lever handle pivoted to the free end of the link, the lever handle being somewhat L-shaped and having its free end extending rearwardly and provided with a hand grip, the front portion of the lever swinging through an arc in the direction of the length of the frame when the opposite end of the lever is manually raised and lowered with respect to the frame, a ground-engaging member pivoted to the front portion of the lever so as to be stepwise advanced over the ground each time the hand grip is raised, an upward movement of the hand grip advancing the ground-engaging member to a new position on the ground and a downward movement advancing the plowshare with respect to the ground-engaging member, and a roller carried by the lever handle at a point where the roller will ride on the frame as the lever handle is manipulated, whereby the front portion of the lever is kept supported on the frame.

5. In a lever plow of the type described, a ground-engaging member adapted to be stepwise advanced over the ground, a tooth carried by the member and adapted to penetrate the ground, a slotted foot-piece normally resting on the tooth and supported on projecting portions thereof with the ground-engaging member extendable through the slot, the foot having a base for contacting with the ground surface, the slot being large enough to permit the foot to swing into various angular positions relative to the ground-engaging member within predetermined limits so that the base of the foot can accommodate itself to irregularities of the ground surface, and means for limiting upward movement of the foot with respect to the tooth and thus limit penetration of the tooth into the ground.

JOSEPH WILLIAMS.

REFERENCES CITED

The following references are of record in the file of this patent:

UNITED STATES PATENTS

| Number | Name | Date |
| --- | --- | --- |
| 142,922 | Knickerbocker | Sept. 16, 1873 |

FOREIGN PATENTS

| Number | Country | Date |
| --- | --- | --- |
| 476,899 | France | June 12, 1915 |